(12) United States Patent
Klingier (10) Patent No.: US 6,622,354 B1
(45) Date of Patent: Sep. 23, 2003

(54) CARABINER

(76) Inventor: Gregory L. Klingier, 824 E. Iowa Ave., Denver, CO (US) 80210

( * ) Notice: Subject to any disclaimer, the term of this patent is extended or adjusted under 35 U.S.C. 154(b) by 0 days.

(21) Appl. No.: 10/143,969

(22) Filed: May 13, 2002

(51) Int. Cl.$^7$ ................................................ F16B 45/02
(52) U.S. Cl. ................................... 24/601.5; 24/599.6
(58) Field of Search .......................... 24/265 H, 601.5, 24/599.1, 599.6, 599.7, 599.8, 592.1, 588.1, 582.1, 598.4

(56) References Cited

U.S. PATENT DOCUMENTS

| | | | | |
|---|---|---|---|---|
| 1,442,101 A | * | 1/1923 | Smith ..................... 24/599.1 X |
| 1,667,927 A | * | 5/1928 | Clarke .................... 24/599.1 X |
| 2,098,466 A | * | 11/1937 | Rodenbach ................ 24/599.7 |
| 4,019,609 A | * | 4/1977 | Wagner .................... 188/65.4 |
| 4,095,316 A | | 6/1978 | Gabriel ......................... 24/234 |
| 4,333,212 A | | 6/1982 | Bibollet ........................ 24/233 |
| 4,645,255 A | * | 2/1987 | Zepf ........................ 294/82.19 |
| 4,811,467 A | | 3/1989 | Lowe ........................... 24/241 |
| 5,005,266 A | | 4/1991 | Fister et al. ................. 24/601 |
| 5,329,675 A | * | 7/1994 | McLean et al. ............. 24/599.6 |
| 5,357,657 A | * | 10/1994 | Petzl .......................... 24/599.9 |
| 5,463,798 A | * | 11/1995 | Wurzer ....................... 24/599.5 |
| 5,577,304 A | * | 11/1996 | Simond ....................... 24/573.5 |

* cited by examiner

Primary Examiner—Robert J. Sandy (57) ABSTRACT

An Improved Carabiner (38) is provided consisting of a Modified Rope Receiving Member (40), Pivoting Gate Member (42), and Sloped Extension Arm (46). The Improved Carabiner (38) mitigates the risk of injury to a climber in the event that the climber falls after improperly clipping a Rope (24) into the Improved Carabiner (38). If the Rope (24) has been clipped improperly, in a fashion known within the art as back-clipping, and the climber falls, the presence of the Sloped Extension Arm (46) serves to divert the rope away from the Pivoting Gate Member (42), thus preventing the Rope (24) from becoming unclipped from the Improved Carabiner (38). An Improved Carabiner Alternate Embodiment (52) is presented in which a Secondary Pivoting Member (54) blocks the Rope from access to the Pivoting Gate Member (58). A Second Alternate Embodiment Carabiner (82) is presented which utilizes the outward force of the Rope (24) to lock the Pivoting Gate Member, Second Alternate Embodiment (100).

4 Claims, 6 Drawing Sheets

CARABINER

CROSS-REFERENCE TO RELATED APPLICATIONS

Not applicable.

STATEMENT REGARDING FEDERALLY SPONSORED RESEARCH AND DEVELOPMENT

Not applicable.

BACKGROUND

1. Field of Invention

The present invention relates to carabiners. More particularly, but not exclusively, it concerns a carabiner used by mountaineers or climbers to ensure their safety with the aid of a rope. This invention concerns an improvement to the carabiner design which mitigates the risk associated with improper use of the carabiner.

2. Description of Prior Art

Carabiners are widely recognized and used in climbing. The devices may be formed of solid materials, or of tubing to afford light weight. Carabiners generally are comprised of a latch arrangement at one end of a pivoting gate member and a rope receiving member, typically C-shaped, which is narrowed and includes an inwardly facing notch. The gate member is slotted to fit over the narrowed portion of the rope receiving member and includes a transverse bar to fit the notch thus forming a latch arrangement. Conventionally, the gate member can rotate with respect to a pivot point, usually a flush rivet, positioned perpendicular to the plane of the rope receiving member. The gate member is spring loaded so as to normally be positioned in the latched position with the rope receiving member. A climber can pass a rope through the carabiner by rotating the gate member away from its latch point with the rope receiving member, thus creating an opening into which the rope may be inserted. This process is called clipping the rope into the carabiner.

Over the years, many improvements have been made to the basic carabiner design. Generally the improvements have focused on decreasing the weight, increasing the ease with which a rope may be clipped into the carabiner, or locking the gate in place once the rope has been clipped. Those improvements which allow the gate to be locked generally require the use of two hands to operate the carabiner, one hand holds the rope receiving member while the other operates the locking means.

In the sport of rock climbing a climber wears a harness to which one end of a rope is attached. The rope passes through a belay device which is attached to the harness of another person, the belayer. The belayer operates the belay device and typically remains at a stable low point while the climber ascends. The climber drags the rope up the rock as he/she ascends while the belayer feeds out rope through the belay device. At various points during the ascent, the climber clips the rope into carabiners which, in turn, are attached to the surface of the rock. If the climber falls, the belayer must grasp the rope securely by means of the belay device. The fall is therefore stopped by means of the belay device and the climber comes to rest suspended from the highest carabiner through which the rope has been run. Thereafter, the belayer may gently lower the climber to the ground by operating the belay device so as to gradually release tension on the rope. Since a climber is often in a precarious position when attempting to clip the rope into a carabiner, he/she usually only has one hand free with which to make the clip. Consequently, although locking carabiners have many uses, including the attachment of a belay device to a climber's harness, they are generally not used as the carabiners into which a climber would clip while making an ascent.

It is widely know within the sport of climbing that there is a right way to clip the rope into the carabiner while making an ascent and there is a wrong way. From the climber's perspective, the right way is for the rope to pass through the carabiner such that the portion of the rope in back of the carabiner leads to the belayer, and the portion in front of the carabiner leads to the climber. If the rope is clipped in the opposite manner to that just described, it is referred to as a "back-clip". Back-clipping is very dangerous in that it can result in the rope slipping free from the carabiner in the event of a fall by the climber. Most of the manufacturers of carabiners have recognized this risk associated with the improper use of their product, and have included instructions and warnings in their product literature to promote the right method of clipping and to avoid back-clipping.

Examples of the prior art include U.S. Pat. No. 4,095,316 to Gabriel, U.S. Pat. No. 4,333,212 to Bilbollet, U.S. Pat. No. 4,811,467 to Lowe, and U.S. Pat. No. 5,005,266 to Fister et. al.

SUMMARY

The essence of the present invention is an improved carabiner which mitigates the risk associated with the fall of a climber in the event that the climber inadvertently back-clips.

Objects and Advantages

In view of the foregoing, it is a primary object of the present invention to provide an improved carabiner that mitigates the risk associated with the fall of a climber in the event that the climber inadvertently back-clips. The present invention will not allow the rope to come free from the carabiner if a climber has fallen with the rope in a back-clipped position with respect to the carabiner.

Another object is that this improvement to the general carabiner design be simple and require no additional learning or effort on the part of the climber relative to the use of a standard carbiner.

Still another object is that the improved carabiner of the present invention add only minimal cost compared to that of a carbiner without the subject improvement.

These and other objects of the subject invention will become apparent to those familiar with the different types carabiners when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

DRAWING FIGURES

The accompanying drawings illustrate three complete preferred embodiments of the present invention according to the best modes presently devised for the practical application of the principles thereof, and in which.

REFERENCE NUMERALS IN DRAWINGS

Figure 1:
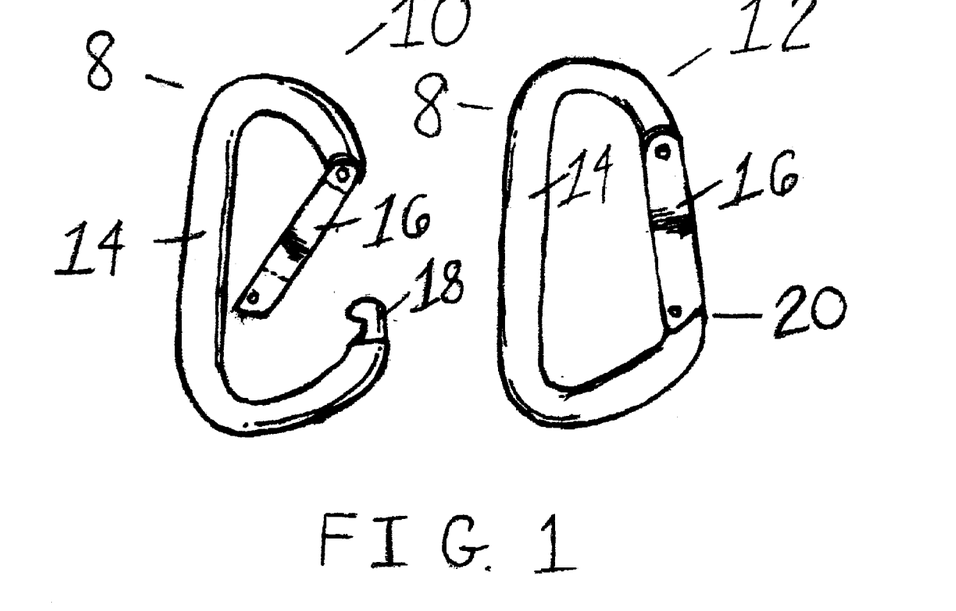
FIG. 1 is a drawing of a typical carabiner, shown in two configurations. The first configuration has the gate open for receipt of a rope. The second configuration has the gate closed.

8 Standard Carabiner
10 Standard Carabiner—Open Configuration
12 Standard Carabiner—Closed Configuration
14 Rope Receiving Member
16 Pivoting Gate Member
18 Notch
20 Latch
22 Canvas Strap
24 Rope
26 Arrow Indicating Direction Toward Climber
28 View—Rope Position Prior To Fall, Properly Clipped
30 View—Rope Position After A Fall, Properly Clipped
32 View—Rope Position Prior To A Fall, Back-Clipped
34 View—Rope Position During A Fall, Back-Clipped
36 View—Rope Position After Undesirable Unclip, Back-Clipped
38 Improved Carabiner
40 Modified Rope Receiving Member
42 Pivoting Gate Member, Improved Carabiner
44 Sloped Extension Arm
46 Pivoting Point
48 View—Rope Position Prior To A Fall, Improved Carabiner, Back-Clipped
50 View—Rope Position During A Fall, Improved Carabiner, Back-Clipped
52 Improved Carabiner Alternate Embodiment
54 Secondary Pivoting Member
56 Alternate Modified Rope Receiving Member
58 Alternate Embodiment Pivoting Gate Member
60 Small Extension
62 Direction Arrow—Rotation Of Secondary Pivoting Member
64 Z Direction Force Vector—Downward Vector In the Plane Of The Carabiner
66 X Direction Force Vector—Horizontal Vector In The Plane Of The Carabiner
68 Y Direction Force Vector—Vector Orthogonal To The Plane Of The Carabiner
70 Upper Clip Portion—Standard Carabiner
72 Lower Clip Portion—Standard Carabiner
74 Side View—Upper Clip Portion, Standard Carabiner
76 Front View—Upper Clip Portion, Standard Carabiner
78 Side View—Lower Clip Portion, Standard Carabiner
80 Front View—Lower Clip Portion, Standard Carabiner
82 Second Alternate Embodiment Carabiner—Open Configuration
84 Upper Clip Portion—Second Alternate Embodiment
86 Lower Clip Portion—Second Alternate Embodiment
88 Side View—Upper Clip Portion, Second Alternate Embodiment
90 Front View—Upper Clip Portion, Second Alternate Embodiment
92 Side View—Lower Clip Portion, Second Alternate Embodiment
94 Front View—Lower Clip Portion, Second Alternate Embodiment
96 Recessed Areas
98 Protruding Nubs
100 Pivoting Gate Member—Second Alternate Embodiment Description and Operation FIG. 1 illustrates a Standard Carabiner 8, shown in both an Open 10 and a Closed 12 configuration. A Rope Receiving Member 14, typically C-shaped, is attached to a Pivoting Gate Member 16. The Rope Receiving Member 14 has a Notch 18 which forms a Latch 20 when the Pivoting Gate Member 16 is allowed to close.

Figure 2:
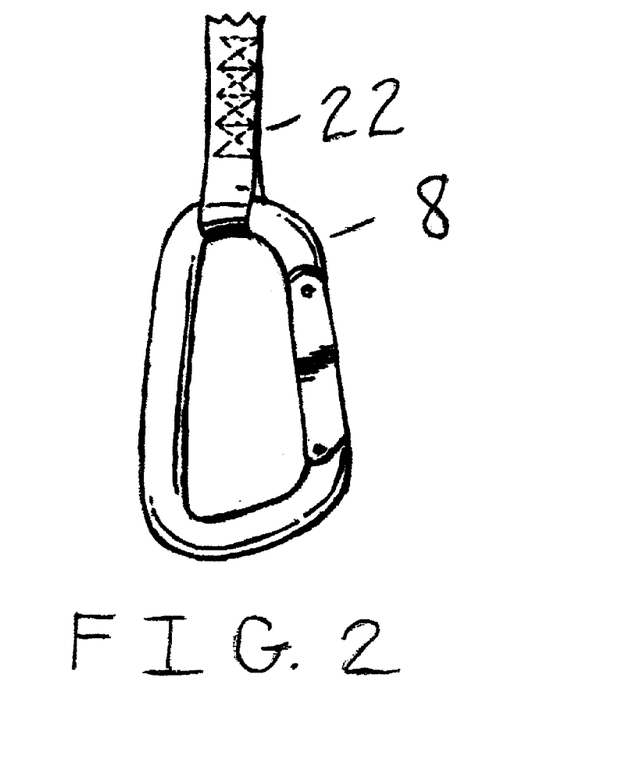
FIG. 2 is a drawing showing a typical use of a carbiner as a rope attachment point into which a climber may clip while making an ascent.

FIG. 2 illustrates a typical configuration for the Standard Carbiner 8 which is being used as a rope attachment point for a climber's ascent. The Standard Carabiner 8 is suspended by a Canvas Strap 22. The upper end of the Canvas Strap 22 is attached to the surface of a rock, not shown, by any of a number of different attachment methods.

Figure 3:
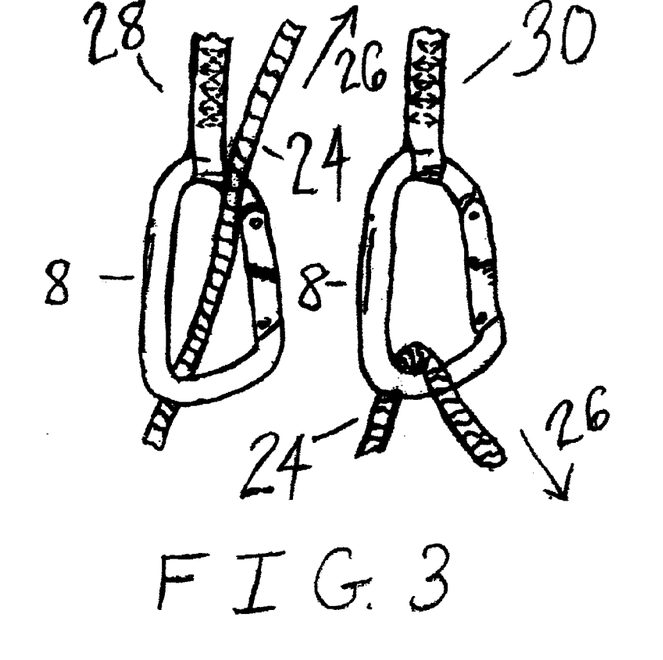
FIG. 3 is an illustration of a standard carabiner showing a rope which has been clipped in the proper fashion. The figure also illustrates the position of the rope after the fall of a climber.

FIG. 3 presents the Standard Carabiner 8 of FIG. 2 with a Rope 24 properly clipped into the Standard Carabiner 8. An Arrow 26 illustrates the direction of the end of the Rope 24 which is attached to a climber. The figure illustrates views showing the Rope Position Prior To A Fall 28 and the Rope Position After A Fall 30.

Figure 4:
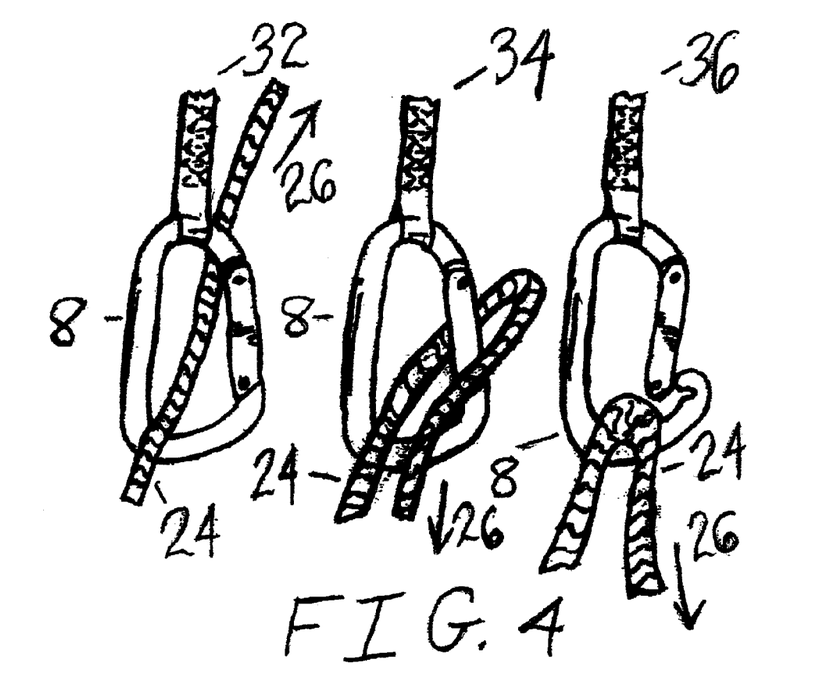
FIG. 4 is an illustration of a standard carabiner showing a rope which has been back-clipped. This figure clearly demonstrates how back-clipping can lead to the rope coming free in the event of a fall by the climber.

FIG. 4 presents the Standard Carabiner 8 of FIG. 2 with the Rope 24 back-clipped into the Standard Carabiner 8. The figure illustrates views showing the Rope Position Prior To A Fall 32, the Rope Position During A Fall 34 but prior to the undesired unclipping phenomenon, and the Rope Position After Undesired Unclipping 36. This figure makes clear the potential for the Rope 24 to become unclipped, if it has been back-clipped, in the event of a fall by the climber.

Figure 5:
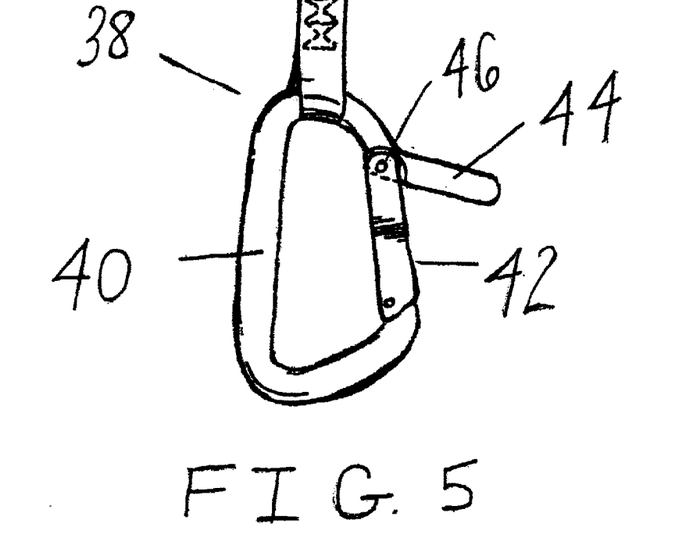
FIG. 5 illustrates the improvement features of the subject invention.

FIG. 5 illustrates the Improved Carabiner 38 of the present invention. A Modified Rope Receiving Member 40 is attached to a Pivoting Gate Member 42. The Modified Rope Receiving Member 40 is only different from the standard Rope Receiving Member 14, FIG. 1, in that it has a Sloped Extension Arm 44 extending outward from the Pivoting Point 46 around which the Pivoting Gate Member 42 rotates. The Pivoting Gate Member 42 of the Improved Carabiner 38 is unchanged relative to the Pivoting Gate Member 16, FIG. 1, of the Standard Carabiner 8, FIG. 1.

Figure 6:
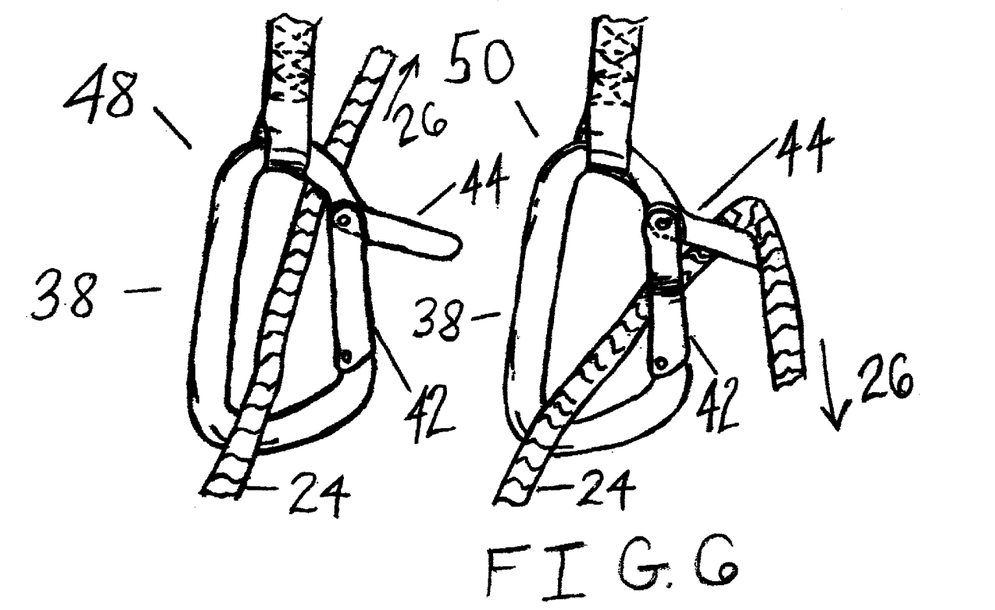
FIG. 6 demonstrates how the improved carabiner of the subject invention will not allow the rope to slip free in the event of a fall by the climber, even if the carabiner has been back-clipped.

FIG. 6 illustrates the Improved Carabiner 38 in a back-clipped configuration showing views of the Rope Position Prior To A Fall 48 and the Rope Position During A Fall 50. The figure clearly shows how the Sloped Extension Arm 44 serves to divert the Rope 24 away from the Pivoting Gate Member 42, thus preventing the Rope 24 from becoming unclipped.

Figure 7:
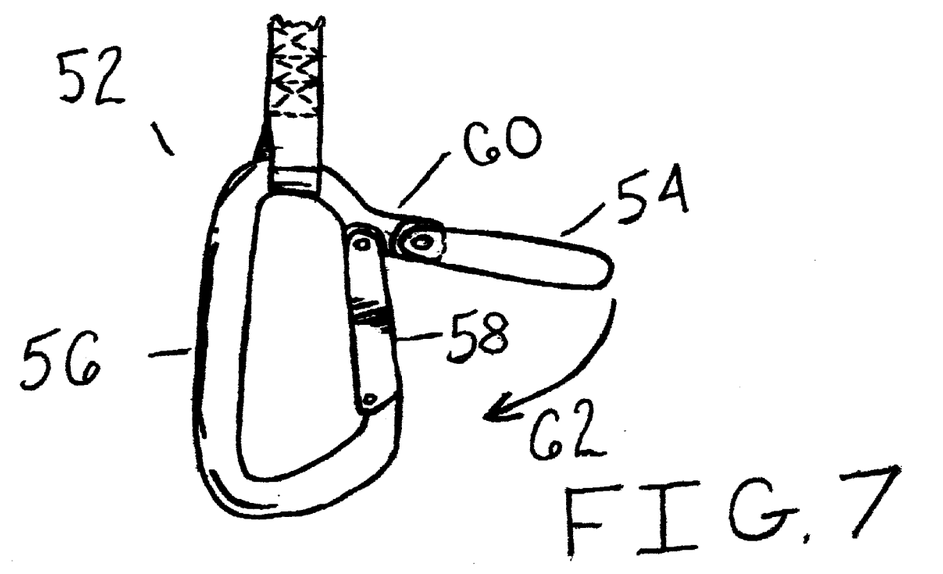
FIG. 7 is an alternate embodiment of the present invention.

FIG. 7 illustrates an Improved Carabiner Alternate Embodiment 52 in which a Secondary Pivoting Member 54 has been attached to an Alternate Modified Rope Receiving Member 56. The device also contains an Alternate Embodiment Pivoting Gate Member 58 which is of like design to the standard Pivoting Gate Member 16, FIG. 1. The Alternate Modified Rope Receiving Member 56 contains a Small Extension 60 to which the Secondary Pivoting Member 54 has been attached. The Secondary. Pivoting Member 54 is spring loaded such that it normally extends outward from its point of attachment. The method for spring loading and attaching the Secondary Pivoting Member 54 are exactly the same as those used for the standard Pivoting Gate Member 16, FIG. 1, and are well documented in the prior art. The Secondary Pivoting Member 54 is of sufficient length such that, if rotated downward in the direction of Rotation Arrow 62, the downward end of the Secondary Pivoting Member 54 extends below the downward end of the Alternate Embodiment Pivoting Gate Member 58. As should be obvious from the views of FIG. 6, if a climber has back-clipped and falls, the Rope 24, not shown in this figure, will contact the Secondary Pivoting Member 54 causing it to rotate in the direction of the Rotation Arrow 62. The Secondary Pivoting Member 54 will thus block the Rope 24, not shown in this figure, from contacting the Alternate Embodiment Pivoting Gate Member 58.

Figure 8:
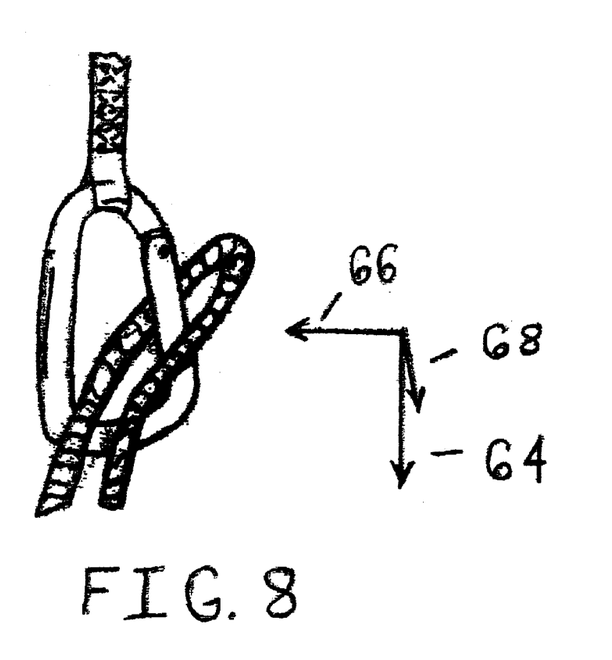
FIG. 8 illustrates the orthogonal force vectors which make up the total force vector for the force exerted by the rope on the carabiner.

FIG. 8 illustrates the 3 orthogonal force vector components that make up the total force vector for the force exerted by the rope on the carabiner when a climber has fallen. An understanding of these different force vectors is needed in order to understand the operation of a Second Alternate Embodiment Carabiner. The Z Direction Force Vector 64 represents the component of the overall force vector which exerts force, relative to the carabiner, in a downward direction along the length of the carabiner and within the plane of the carabiner. The X Direction Force Vector 66 represents the component of the overall force vector which exerts force, relative to the carabiner, in a horizontal direction along the width of the carabiner and within the plane of the carabiner. It is the force represented by this X Direction Force Vector 66 which can cause the carabiner to come open if a climber falls when the carabiner has been back-clipped. The Y Direction Force Vector 68 represents the component of the overall force vector which exerts force, relative to the carabiner, in an outward direction orthogonal to the plane of the carabiner. The force exerted by this Y Direction Force Vector 68 is utilized in the Second Alternate Embodiment Carabiner to prevent the carabiner from opening, as is illustrated in following figures.

Figure 9:
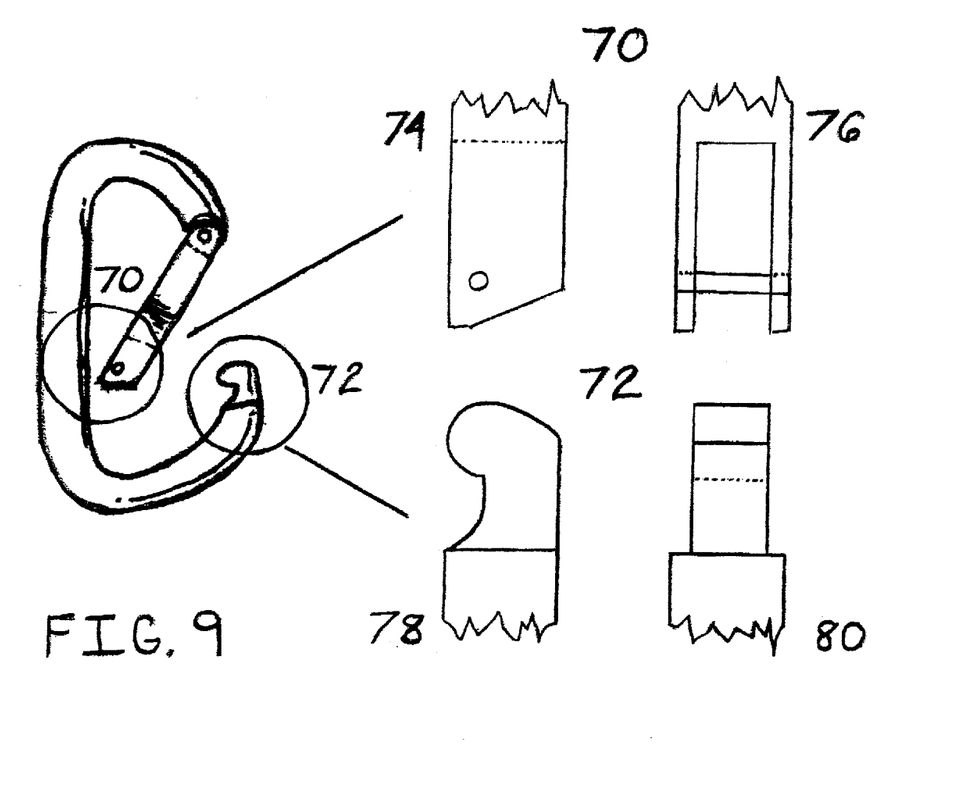
FIG. 9 is a close up view of the portions of a standard carabiner which meet to clip the carabiner closed.

FIG. 9 is a close up view of the portions of a Standard Carabiner 10 which meet to clip the carabiner closed consisting of an Upper Clip Portion 70 and a Lower Clip Portion 72. The Upper Clip Portion 70 has side 74 and front 76 views. The Lower Clip Portion 72 has side 78 and front 80 Views. These views of a standard carabiner are used to establish a reference from which to illustrate, in FIG. 10, the differences in the Second Alternate Embodiment Carabiner.

Figure 10:
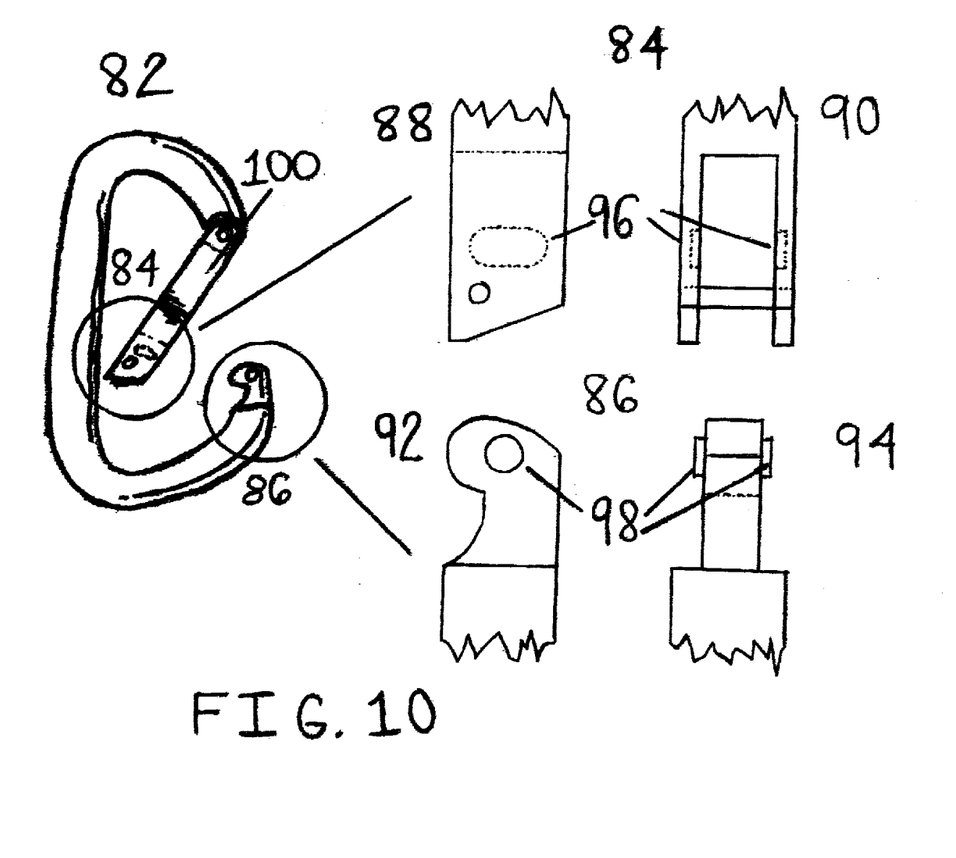
FIG. 10 is a close up view, for a second alternate embodiment, of the portions of the carabiner which meet to clip the carabiner closed.

FIG. 10 is a close up view of the portions of a Second Alternate Embodiment Carabiner 82 which meet to clip the carabiner closed, consisting of an Upper Clip Portion, Second Alternate Embodiment 84 and Lower Clip Portion, Second Alternate Embodiment 86. The Upper Clip Portion, Second Alternate Embodiment 84 has side 88 and front 90 views. The Lower Clip Portion, Second Alternate Embodiment 86 has side 92 and front 94 views. The Upper Clip Portion, Second Alternate Embodiment 84 has two Recessed Areas 96. The Lower Clip Portion, Second Alternate Embodiment 86 has two Protruding Nubs 98. Like other carabiners, the Second Alternate Embodiment Carabiner 82 has a Pivoting Gate Member 100. Other than for its Recessed Areas 96 and Protruding Nubs 98, the Second Alternate Embodiment Carabiner 82 is similar to a Standard Carabiner 10.

If a climber's fall is such that a sufficient X Direction Force Vector 66 is generated to cause a conventional carabiner to become unclipped in the case of a back-clip, then undoubtedly a Y Direction Force Vector 68 will also be generated. In the case of the Second Alternate Embodiment Carabiner 82, this Y Direction Force Vector 68 will cause the Pivoting Gate Member 100 to rotate slightly out from the plane of the carabiner. This outward movement of the Pivoting Gate Member 100 will cause one of the Protruding Nubs 98 to pass within one of the Recessed Areas 96. In this orientation, the Recessed Area 96 will block the Protruding Nub 98 from movement in the direction of the X Direction Force Vector 66, thus preventing the Pivoting Gate Member 100 from opening.

The established manufacturing dimensional clearances between mating parts of most existing carabiners are such that most existing pivoting gate members can already rotate slightly out of the plane of the carabiner, thus many standard carabiners need only be modified to have Protruding Nubs 98 and Recessed Areas 96 in order to form Second Alternate Embodiment Carabiners. If, however, design modification is needed to allow sufficient outward rotation of a pivoting gate member, this type of modification requires only a slight change in the design of the upper attachment point for a pivoting gate member and such a modification is well understood by those accomplished in the art of carabiner design.

Conclusion, Ramifications, and Scope

Thus the reader will see that the improved carabiner of the invention provides a simple economical device which mitigates the risk associated with inadvertent back-clipping by a climber.

While the above description contains many specificities, these should not be construed as limitations on the scope of the invention, but rather as exemplification of three embodiments thereof Accordingly, the scope of the invention should be determined not by the embodiments illustrated, but by the appended claims and their legal equivalents.

The embodiments of the invention for which an exclusive privilege and property right are claimed are defined as follows:

1. An improved carabiner which mitigates the risks associated with the inadvertent occurrence of back-clipping, comprising in combination:

a. a rope receiving member capable of receiving a cross section of a rope through an opening in said rope receiving member and of containing said rope within said rope receiving member once said opening has been closed by a pivoting gate member, said rope receiving member also containing a means to accept an end of said pivoting gate member, b. said pivoting gate member pivotally attached to an upper portion of said rope receiving member, spring loaded so that an unattached end of said pivoting gate member is normally positioned within said means to accept an end of said pivoting gate member, thus forming a latch, c. a rope diversion means, attached to said rope receiving member, shaped and positioned so as to divert said rope away from said pivoting gate member in the event a climber has fallen after back-clipping said rope into said improved carabiner.

2. An improved carabiner which mitigates the risks associated with the inadvertent occurrence of back-clipping, comprising in combination:
   a. a rope receiving member capable of receiving a cross section of a rope through an opening in said rope receiving member and of containing said rope within said rope receiving member once said opening has been closed by a pivoting gate member, said rope receiving member also containing a means to accept an end of said pivoting gate member,
   b. said pivoting gate member pivotally attached to an upper portion of said rope receiving member, spring loaded so that an unattached end of said pivoting gate member is normally positioned within said means to accept an end of said pivoting gate member, thus forming a latch,
   c. a pivoting rope blocking means, attached to said rope receiving member, shaped and positioned so as rotate in front of said pivoting gate member in the event a climber has fallen after back-clipping a rope into said improved carabiner, thus preventing said rope from contacting said pivoting gate member.

3. An improved carabiner which mitigates the risks associated with the inadvertent occurrence of back-clipping, comprising in combination:
   a. a rope receiving member capable of receiving a cross section of a rope through an opening in said rope receiving member and of containing said rope within said rope receiving member once said opening has been closed by a pivoting gate member, said rope receiving member also containing a means to accept an end of said pivoting gate member,
   b. said pivoting gate member pivotally attached to an upper portion of said rope receiving member, spring loaded so that an unattached end of said pivoting gate member is normally positioned within said means to accept an end of said pivoting gate member, thus forming a latch,
   c. a pivoting gate member locking means which utilizes an outward component, perpendicular to the plane of said carabiner, of a force exerted on said improved carabiner by said rope during a fall of a climber when said improved carabiner has been back-clipped, to block said pivoting gate member from opening.

4. The improved carabiner of claim 3 in which said pivoting gate member locking means comprises a protruding portion on a lower end of said rope receiving member and a recessed area on a lower end of said pivoting gate member, whereby said protruding portion is received within said recessed area in the event of a fall by a climber after back-clipping.

* * * * *

UNITED STATES PATENT AND TRADEMARK OFFICE
CERTIFICATE OF CORRECTION

PATENT NO. : 6,622,354 B1
DATED : September 23, 2003
INVENTOR(S) : Gregory L. Klingler It is certified that error appears in the above-identified patent and that said Letters Patent is hereby corrected as shown below:

<u>Title page,</u>
Item [76], Inventor, should read -- Gregory L. Klingler --.

Signed and Sealed this

Sixteenth Day of December, 2003

JAMES E. ROGAN
*Director of the United States Patent and Trademark Office*